Figure 1:
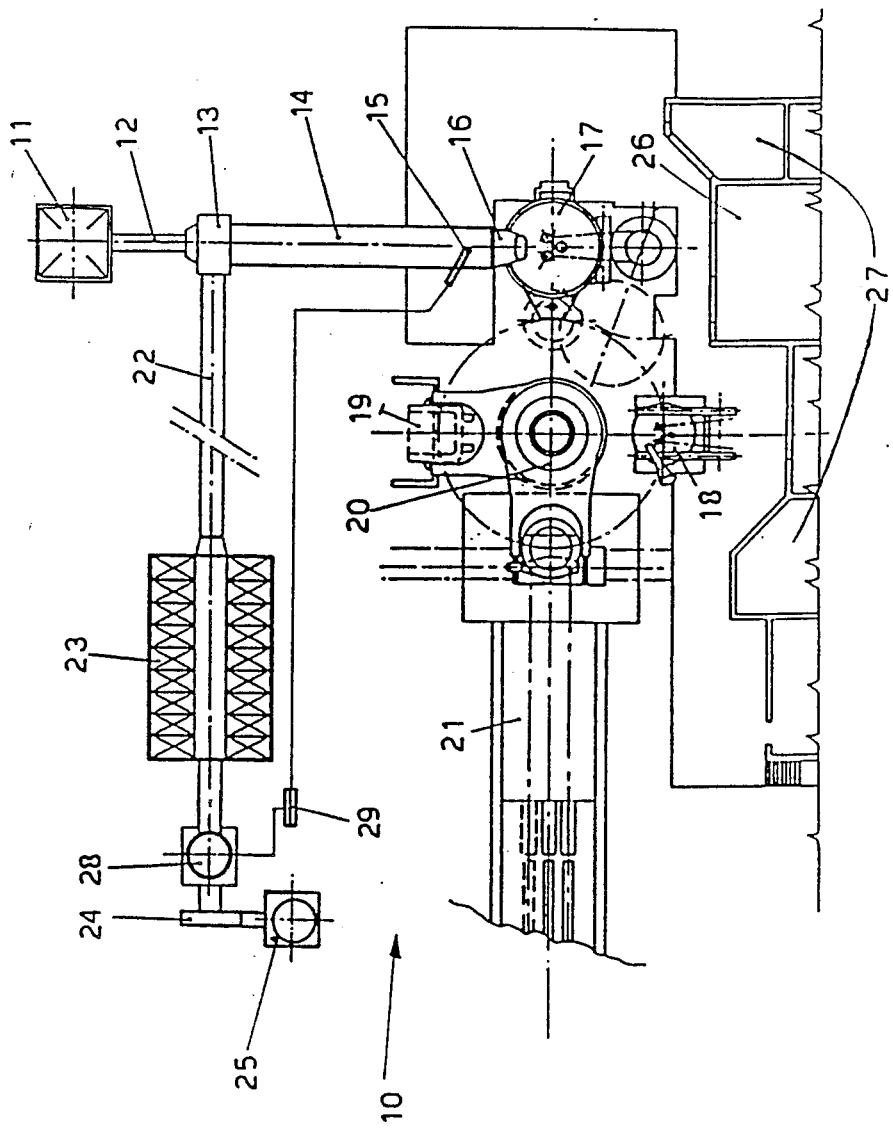

United States Patent [19]

Benedetti et al.

[11] Patent Number: 4,898,227

[45] Date of Patent: * Feb. 6, 1990

[54] PLANT TO CONVERT A METALLIC CHARGE INTO SEMIFINISHED PRODUCTS

[75] Inventors: Giampietro Benedetti, Campoformido; Fulvio Fasano, Gorizia, both of Italy

[73] Assignee: Danieli & C. Officine Meccaniche SpA, Buttrio, Italy

[ * ] Notice: The portion of the term of this patent subsequent to Jun. 21, 2005 has been disclaimed.

[21] Appl. No.: 261,390

[22] Filed: Oct. 24, 1988

Related U.S. Application Data

[62] Division of Ser. No. 100,615, Sep. 24, 1987, Pat. No. 4,797,154.

[30] Foreign Application Priority Data

Sep. 25, 1986 [IT] Italy .................. 83413 A/86

[51] Int. Cl.$^4$ .................. B22D 11/00; B22D 11/14
[52] U.S. Cl. ........................ 164/417; 164/437; 164/477; 164/488; 164/266
[58] Field of Search ............ 164/437, 438, 477, 266, 164/488, 335, 337, 417; 222/591

[56] References Cited

U.S. PATENT DOCUMENTS

| 55,442 | 6/1866 | Lohage | 75/50 |
| 3,693,960 | 9/1972 | Golda et al. | 266/276 |

(List continued on next page.)

FOREIGN PATENT DOCUMENTS 49890 4/1982 European Pat. Off. .
285388 6/1914 Fed. Rep. of Germany .

(List continued on next page.)

OTHER PUBLICATIONS

M. Fischer, "Torre porta siviere per impianto di colato continua", La Rivista dei La Rivista dei Ciscinett, No. 215.

Primary Examiner—Richard K. Seidel
Attorney, Agent, or Firm—Wegner & Bretschneider

[57] ABSTRACT

Integrated plant (10) to convert a metallic charge continuously into semi-finished products such as billets, blooms, slabs, bars or ingots, which comprises in close cooperation a chamber (14) to pre-heat a controlled metallic charge, the chamber (14) including a burner (15) and a terminal feeder (16) feeding an electric furnace (17) with a controlled flow, and comprises also the electric furnace (17), a continuously functioning transformer (26), a multifunction manipulator (20) with two independent arms able to rotate circumferentially and to move vertically to handle two ladles (18) at one and the same time at least between a tapping station of the electric furnace (17) and a casting and tapping station (21), and at least one casting and tapping station (21) served by a tundish feeding liquid metal continuously, a station to refine the liquid metal in the ladle (18) being located between the tapping station of the furnace (17) and the tapping and casting station (21).

Smelting method obtained with the plant (10) of the claims hereinbefore, which feeds molten metal continuously at least to one casting statio (21) by means of two ladles (18) feeding a tundish alternately and starts with a pre-set and variable metallic charge, such metallic charge being fed continuously in the opposite direction to heating means in a pre-heating chamber (14), such charge feeding continuously with an adjustable flow an electric furnace (17) when liquid metal is tapped regularly and partially into ladles (18) able to move along a circumference, in which method the liquid metal is treated and refined in the ladle (18) before being delivered by one of the ladles (18) alternately into a tundish which transfers it continuously to the casting station (21) while the other ladle (18) is engaged in succession in operations of preparation, charging and refining, the cycle proceeding continuously without operating interference.

6 Claims, 3 Drawing Sheets

U.S. PATENT DOCUMENTS

| | | |
|---|---|---|
| 4,002,465 | 1/1977 | Brusa . |
| 4,199,084 | 4/1980 | Margraf et al. ............... 222/591 |
| 4,286,738 | 9/1981 | Blum ................................. 222/591 |
| 4,371,100 | 2/1983 | Mühlbauer et al. ............. 222/591 |
| 4,540,058 | 9/1985 | Kremer et al. .................. 266/276 |
| 4,564,388 | 1/1986 | Vallomy ............................. 75/46 |
| 4,627,601 | 12/1986 | Berthat ............................. 75/46 |
| 4,664,701 | 5/1987 | Royzman .......................... 75/46 |
| 4,696,458 | 9/1987 | Royzman .......................... 75/46 |
| 4,751,956 | 6/1988 | Benedetti ........................ 164/437 |

FOREIGN PATENT DOCUMENTS

| | | |
|---|---|---|
| 2044768 | 9/1970 | Fed. Rep. of Germany . |
| 42495 | 9/1962 | France . |
| 1371056 | 7/1964 | France . |
| 1551721 | 11/1968 | France . |
| 1578603 | 7/1969 | France . |
| 2355072 | 1/1978 | France . |
| 2437258 | 9/1978 | France . |
| 86/01473 | 2/1986 | PCT Int'l Appl. . |
| 677023 | 2/1950 | United Kingdom . |

OTHER PUBLICATIONS

John A. Vallomy, "Continuous electric furnace steelmaking-The CONSTEEL process," Iron and Steel Engineer, Nov. 1985, No. 11, pp. 44–47.

Express Information on Foreign Ferrous Mettalurgy, "Steelmaking", Chermetinformatsia Institute, 1975, No. 34.

PLANT TO CONVERT A METALLIC CHARGE INTO SEMIFINISHED PRODUCTS

This application is a divisional of Ser. No. 100,615 filed Sept. 24, 1987, now U.S. Pat. No. 4,797,154.

The invention provides an integrated smelting and casting plant to convert a metallic charge into semifinished products obtained by continuous casting, starting directly with a metallic charge without and discontinuity in working.

The plant of the invention can produce billets, blooms, slabs, bars and ingots with continuous and/or discontinuous casting processes; the invention is applied advantageously to continuous casting processes.

The invention concerns also a smelting and casting method which can be obtained with the above plant.

According to the invention the metallic charge can consist of previously reduced metal, scrap, cast iron, iron ore, etc., as individual components or in the form of a mixture of basic components.

The invention therefore concerns a plant and also a method obtainable with such plant which provide in close cooperation for the continuous charging of an electric furnace and for the discontinuous working of such electric furnace and also for the continuous feeding of a casting station, after refining in a ladle.

At the present time the plants to feed casting zones continuously provide several independent and specialized areas which are coordinated only by the functional phases of their mutual contact and exchange occurring in an uncontrolled cycle.

Thus they provide a zone for treatment of scrap with the handling of skips which may be pre-heated or not.

Next, they provide for the charging of the electric furnace by skips with a temporary interruption of the working of the electric furnace itself.

The molten material is then fed to the ladles, which are moved by bridge cranes or other conveyor means to the casting station.

Such known types of plant entail a series of problems such as the discontinuity of operations, frequent interruption of the logical sequences of the various steps, the necessity for large spaces, times of the various steps not coordinated nor properly controlled, loss of energy, many maintenance points, etc.

Moreover, the spaces required are very large and the sheds needed mean heavy investments owing to the considerable areas which have to be covered.

Next, the known systems require a noteworthy use of electrical power; they necessitate discontinuous employment of the electrical power used; they create considerable disturbances in the electricity supply and occurrences of fluctuation of the electrical voltage; they provide a relatively low rate of hourly output with a low usage factor.

They also have a high specific consumption of electrical power and entail a heavy consumption of electrodes.

It is therefore correct to say that the known systems lead to a relatively low efficiency of processes and a heavy consumption of power and other auxiliary materials.

Furthermore, the known systems require a considerable investment and heavy costs for running, maintenance, installation, etc.

WO-A-8.601.230 (INTERSTEEL) discloses an integrated plant able to feed a casting line continuously.

The disclosure, however, entails contradictions in terms since in fact it is unable to feed the casting station continuously. Moreover, it provides for refining directly in the electric furnace, with a reduced output and a great consumption of electric power. Furthermore, it arranges for a handling of the ladles which involves a great waste of energy and a considerable waste of time.

LU-A-42495 (COCKERILL) has also been published but provides for a temporary conversion of an electric furnace into a converter for refining purposes. This entails downtimes, waste of energy, useless occupation of space and general and specific coordination problems.

To obviate the above shortcomings and obtain many advantages as regards technology, power and finance, the present applicant has designed, tested and embodied the present invention.

The technological advantages accruing from a plant according to the invention and from the method obtainable thereby may be listed substantially as follows:

a reduction in the electrical power employed, given an equal output of the plant;

a maximum and constant use of the electrical power employed;

the elimination of disturbances of the electricity supply and of the occurrences of fluctuation of the voltage of the supply;

an increase in the hourly rate of output, given an equal employment of electrical power;

minimum specific consumption of electrical power;

minimum specific consumption of electrodes.

As regards the advantages relating to the power employed, the invention leads to an overall increase in yield of the process and therefore a considerable reduction of consumption of power and of some auxiliary materials.

The financial advantages accruing from the invention consist in:

smaller investment owing to the lower installed power, given an equal output, since on the one hand the crane is employed less and on the other hand the lay-out is substantially compact;

lower running costs owing to the lower consumption of power and auxiliary materials;

lower overall cost of the sheds and relative civil works, together with a lower cost for labour and power employed;

lower maintenance costs.

This plurality of advantages will become more obvious in the following description and is proper to the invention as set forth.

According to the invention the metallic charge is fed continuously through a pre-heating plant.

In the pre-heating plant the metallic charge is pre-heated by using the appreciable heat of the discharge fumes and gases of the electric furnace and also the heat of combustion of a suitable burner. According to the invention the pre-heating of the charge is carried out in a controlled atmosphere.

The pre-heating temperature according to the invention may range from 300° C. to 1000° C., and it is enough to regulate suitably the flow of the heating energy.

Since the pre-heating of the charge takes place in a controlled atmosphere, the metallic yield of the metallic charge is affected favourably.

The pre-heated metallic charge is fed continuously into the electric furnace. The quantity fed over a period of time is not constant but is subject to regulation with a view to keeping the required temperature of the metallic bath within the electric furnace.

The temperature of the metallic bath must have a pre-set development during the whole cyclic process according to the invention.

According to the invention a transformer which feeds the electrodes of the furnace works continuously and the only interruptions are of a programmed type, that is, due to maintenance work or replacement of electrodes.

A strict control of the composition of the slag, as permitted by the method obtained with the invention, has the result that work to maintain the furnace lining is seldom required and is of a very small extent.

The chemical composition of the bath and its metallurgical condition can be controlled continuously.

So as to control the bath, the fuels, oxygen, desulphurizing mixtures, deoxidants and mixtures for the foamed slag are blown into the metal/slag interface.

It is also arranged, according to the invention, to blow these elements directly into the bulk of the metallic bath by employing porous inserts positioned in the refractory lining of the furnace.

The following operations are performed as a feature of the invention in the electric furnace: temperature control, correction of carbon, desulphurizing and control of the oxygen.

Control of other chemical elements is optimized instead with a dynamic management of the process.

The quantity of slag is controlled by means of regular scorifications.

This body of arrangements, which are proper to the invention, enables the tapping of the furnace to be carried out at extremely regular times in the long term, thus enabling the planned output to be met.

According to the invention the time between two consecutive tappings can be reduced to about thirty minutes.

The steel tapped may be of an effervescent type without furnace slag, if so required.

Another feature of the invention is that the final deoxidation and addition of iron-alloys to adjust the chemical composition are performed in the ladle during tapping, an inert gas being blown into the ladle itself at the same time.

Yet another important feature of the invention is that the final adjustment of the temperature and chemical composition is performed in an appropriate station, being made possible by the multifunction manipulator which handles the ladles.

Such manipulator, as disclosed in EP No. 219.891, provides for two independent rotary arms which can be positioned at least at 90° or less to each other. Each of these independent arms bears a ladle which can be moved circumferentially on the horizontal plane or vertically in any position taken up circumferentially.

To enable the pre-heated metallic charge to be fed continuously and to be smelted even during the tapping, a consistent residue of liquid steel is left systematically in the furnace. This residue acts as a buffer stock of heat in the period immediately following the tapping.

As we said earlier, the plant according to the invention provides for a multifunction manipulator in cooperation with the electric furnace, the manipulator being of the type described in EP No. 219.891 and being suitable to handle the ladles.

This multifunction manipulator comprises two independent co-axial arms able to rotate continuously through 360° and to bear the ladles. These rotary arms handle the ladle in the tapping station and in the intermediate stations such as the stations for heating the ladle, the stations for restoring the closure of the mould box, the station for heating the molten bath and forpossible degassing, the casting station and the station for discharge of slag and for washing the ladle.

According to the invention the multifunction manipulator, therefore, performs a great number of functions in a very compact space and feeds the casting zone directly and continuously.

Such feeding takes place by means of a ladle handled by the multifunction manipulator itself in connection with the tapping and the casting, the ladle cooperating in the casting station with a tundish of which the content of liquid metal is such as to enable the actual casting station itself to be fed continuously even during the transient states of changing the ladle.

Figure 2:
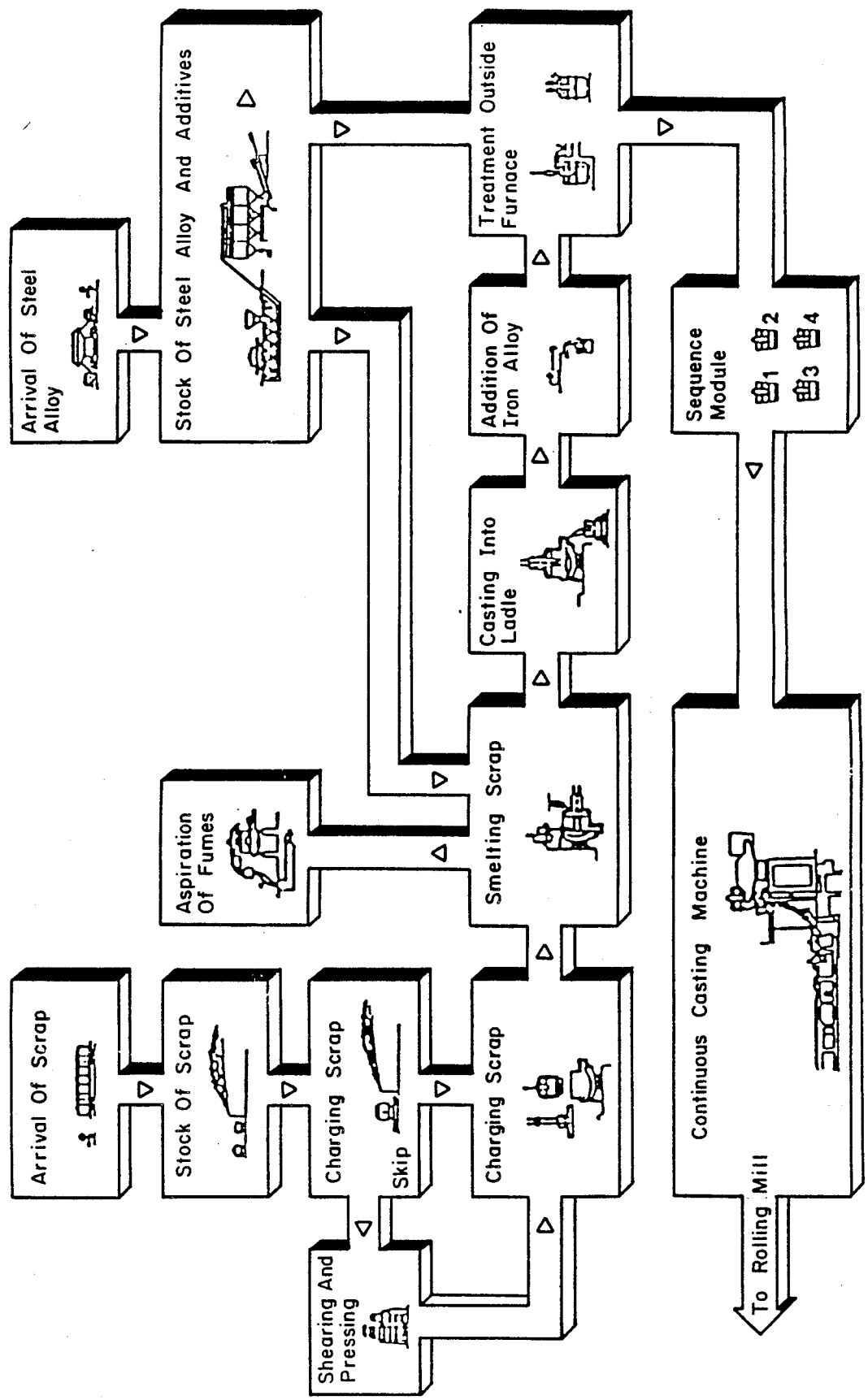
Figure 4:
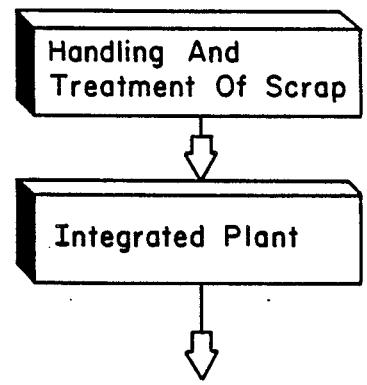
Figure 3:
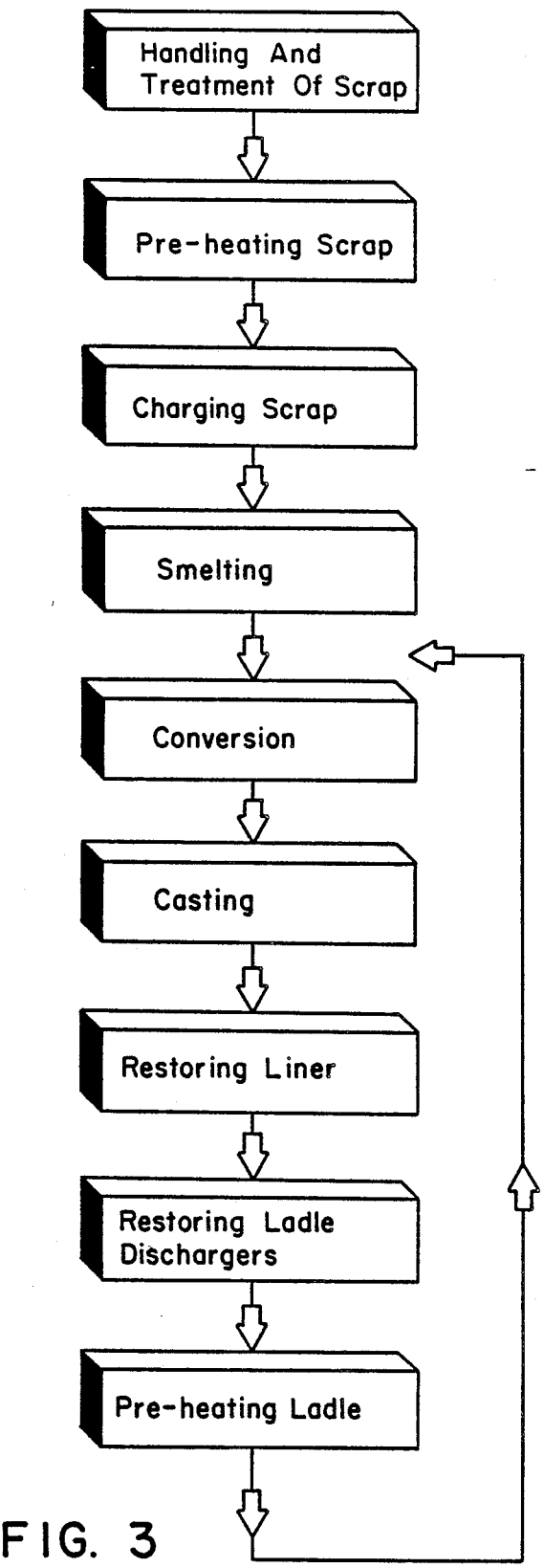

The attached figures give a diagrammatic illustration of a preferred embodiment of the invention and show the following:

FIG. 1 gives a plan view of a plant according to the invention;

FIG. 2 shows a conventional cycle of the feeding of a continuous casting plant;

FIG. 3 gives a block diagram of the conventional cycle of FIG. 2;

FIG. 4 gives a block diagram of the cycle which can be obtained with the plant according to the invention.

FIG. 1 shows a vessel 11 which feeds the charge and into which a metallic charge is fed continuously with the required composition and properties.

The metallic charge is sent from the feeder vessel 11 through a conveyor conduit 12 into a pre-heating chamber 14, which comprises terminally a manifold 13 to collect gases and fumes. The pre-heating chamber 14 consists of a rotary drum which enables the metallic charge to be invested uniformly by heating means.

The heating means, such as the gases and fumes leaving an electric furnace 17 and the gases and fumes produced by the action of a burner 15 working inside the pre-heating chamber 14 and in the neighbourhood of a feed channel 16, pass through the pre-heating chamber 14 in the opposite direction to the metallic charge.

The final pre-heated temperature of the metallic charge may be varied between 300° C. and 1000° C. by regulating suitably the flow of the heating means and therefore of the heating energy.

An environment with a controlled atmosphere is maintained within the pre-heating chamber 14 to prevent the metallic yield being affected unfavourably.

The pre-heated metallic charge is charged continuously into the electric furnace 17 through the feed channel 16.

The flow of the metallic charge through the feed channel 16 is regulated continuously by appropriate regulator means so as to maintain the required temperature in the metallic bath, since the invention deems it important that the development of the temperature of the metallic bath should follow pre-set values during the process.

The electric furnace 17 is supplied by a transformer or by the electricity supply network 26, which operates continuously. The transformer 26 is halted only for programming work or exceptional occurrences.

Tapping of the electric furnace 17 is carried out at regular intervals, the invention permitting the time between one tapping and the next one to be shortened to about thirty minutes.

The tapping time according to the invention is shortened to about two minutes and the tapping is performed in such a way that a stock of liquid metal is left in the electric furnace 17 and may amount to even 40% of the nominal capacity of the furnace.

The tapped metal is collected in a ladle furnace 18 borne and handled by a multifunction manipulator 20 of the type of EP No. 219.891 which moves and positions the ladle 18 in the various stations needed to carry out all the casting functions and also the functions of restoring the ladle itself.

The multifunction manipulator 20 employed is of the type described and identified above and moves two ladles 18 at one and the same time.

The multifunction manipulator 20 has a tapping station in cooperation with the electric furnace 17, a station for heating the molten bath and for possible degassing, a scorification station and a casting station in cooperation with the tundish which serves the casting station 21, thus making continuous casting advantageously possible in view of the very short times required to replace a ladle 18.

Moreover, the multifunction manipulator 20 handles the ladle 18 in the station for discharging the slag and washing the ladle, in the station for heating the ladle and also in the station for restoring the closure of the mould box.

The various stations are positioned at 45° and 90° to each other and the two ladles can be reciprocally positioned at a right angle to the axis of rotation of the multifunction manipulator 20.

In the casting station the multifunction manipulator 20 enables the ladle furnace 18 to feed its contents to the tundish serving the casting station 21; in view of the functional nature of the multifunction manipulator 20 the casting station 21 is fed continuously since even when the contents of liquid metal of the tundish are at a minimum level, the are enough to cover the transient state of replacement of a ladle 18 according to the invention.

The casting station 21 consists advantageously of a tundish serving a continuous casting plant, but may consist of a zone for casting into ingot moulds, a zone for casting into moulds or a combined multifunction zone.

The casting station 21 therefore has available a tundish able to hold enough liquid metal to enable the multifunction manipulator 20 to replace an empty ladle 18 with a full ladle 18. In view of the very short times required by the invention for replacing a ladle 18, the content of the tundish too is reduced.

The fumes and gases leaving the collector manifold 13 and passing through the pre-heating chamber 14 in the opposite direction to the metallic charge are taken by a fume discharge duct 22, which delivers them to filters 23, whence they are aspirated by a fan 24 which draws them to a stack 25.

A heat regenerator 28 is included between the fan 24 and the stack 25 or between the filters 23 and the fan 24 and may cooperate with the whole gaseous mass leaving the filters 23 or only with a part thereof. This heat regenerator 28 is employed to pre-heat the air used by the burner 15, this air being possible delivered by a second fan 29.

In a variant the heat regenerator 28 is located upstream of the filters 23.

The plant according to the invention may be completed with premises for the services and controls.

As can be understood readily from the traditional cycle shown in FIG. 2, the normal method requires a considerable effort of a technical and organizational type to obtain even a minimum coordination between the various functions needed for conversion of the material of the metallic charge into molten material and for its subsequent casting.

FIG. 2 identifies clearly the important steps, which are stated in the individual identification blocks. The bottlenecks or delays which occur in the known art are determined either by the crossing points or the junctions, and the figure shows clearly all the risks of delays, interferences and unfavourable results which may take place between several steps.

In FIG. 3 a block diagram indicates the plurality of the main successive and also repetitive steps belonging to the conventional cycle shown in FIG. 2, steps which demand a considerable sequential coordination of the steps themselves if delays, wastes of time and mistakes and malfunctions more generally are to be avoided.

FIG. 4 shows the simplification of the productive cycle which can be obtained with the method of the invention since the whole is greatly concentrated and the working obtainable can be managed automatically or semi-automatically without any man having to take operational action or to introduce casual and fortiutous alternative sequences.

A man therefore can only perform control functions and even these functions can be replaced by automated means.

We claim:
1. A system for the continuous conversion of metallic charge into semifinished products, comprising:
   an electric furnace for metling the metallic charge, having electrodes; and
   a preheating chamber for preheating the metallic charge, said chamber having first and second ends;
   a burner communicating with said chamber between its first and second ends;
   a terminal feed channel connected to said second end of said chamber, communicating with said furnace, for continuously feeding preheated charge materials into the furnace at a controlled and adjustable rate;
   a continuously functioning transformer communicating with said furnace to supply electrical power to the electrodes of said furnace;
   a tapping station, for tapping molten metal from said furnace;
   a casting station for the continuous casting of the molten charge, said casting station comprising a tundish and a continuous caster, said tundish being communicable with said continuous caster to feed molten metal, at a controlled rate, to the continuous caster;
   a refining station for refining molten metal, said refining station being positioned between said tapping and casting stations;
   first and second ladles for containing molten metal;
   a multi-functional manipulator for independently carrying the ladles between said tapping, refining and casting stations and for the simultaneous manipulation of said first and second ladles, comprising first and second rotatable arms, said arms being circumferentially and vertically traversable independently of each other, with said first arm carrying the first ladle and said second arm carrying the second ladle.

2. A system according to claim 1, further comprising a preparation station located between said casting and said tapping stations, to prepare the ladles to accept molten metal from the tapping station.

3. A system according to claim 2, wherein said first arm of the multi-functional manipulator bears and moves said first ladle in the refining station while said second arm bears and moves said second ladle in the casting station, the two ladles being positioned at about 90° to each other when the first ladle is in the refining station.

4. A system according to claim 2, wherein said preparation station is served by said multi-functional manipulator.

5. A system according to claim 4, wherein said preheating chamber is a rotary drum.

6. A system according to claim 5, further comprising:
- a conveyor conduit having first and second ends;
- a feeder vessel connected to said first end of said conveyor conduit;
- a collector manifold communicating with said second end of the conveyor conduit and said first end of the preheating chamber;
- at least one filter cooperating with the manifold
- a stack cooperating with said filter; and
- a heat regenerator, located between said stack and said filter to preheat the combustion air of the burner.

* * * * *